United States Patent
Kim et al.

(10) Patent No.: US 12,467,097 B2
(45) Date of Patent: Nov. 11, 2025

(54) DNA METHYLATION MARKER FOR PREDICTING RECURRENCE OF LIVER CANCER, AND USE THEREOF

(71) Applicant: LEPIDYNE CO., LTD., Seoul (KR)

(72) Inventors: Young Joon Kim, Seoul (KR); Da Won Kim, Seoul (KR); Tae You Kim, Seoul (KR); Kwang Woong Lee, Seoul (KR); Jeong Sil Ha, Seoul (KR)

(73) Assignee: LEPIDYNE CO., LTD., Seoul (KR)

( * ) Notice: Subject to any disclaimer, the term of this patent is extended or adjusted under 35 U.S.C. 154(b) by 808 days.

(21) Appl. No.: 17/434,675

(22) PCT Filed: Feb. 26, 2020

(86) PCT No.: PCT/KR2020/002727
§ 371 (c)(1),
(2) Date: Aug. 27, 2021

(87) PCT Pub. No.: WO2020/175903
PCT Pub. Date: Sep. 3, 2020

(65) Prior Publication Data
US 2023/0109129 A1   Apr. 6, 2023

(30) Foreign Application Priority Data
Feb. 28, 2019  (KR) .................. 10-2019-0024379

(51) Int. Cl.
*C12Q 1/6886* (2018.01)

(52) U.S. Cl.
CPC ...... *C12Q 1/6886* (2013.01); *C12Q 2600/118* (2013.01); *C12Q 2600/154* (2013.01)

(58) Field of Classification Search
None
See application file for complete search history.

(56) References Cited

U.S. PATENT DOCUMENTS

| | | | |
|---|---|---|---|
| 2014/0094380 A1 | 4/2014 | Sherlock et al. | |
| 2018/0274039 A1 | 9/2018 | Zhang et al. | |
| 2019/0345559 A1* | 11/2019 | Szyf .................... | C12Q 1/6886 |

FOREIGN PATENT DOCUMENTS

| | | |
|---|---|---|
| CN | 101675171 A | 3/2010 |
| CN | 107541565 A | 1/2018 |
| JP | 2015006163 A | 1/2015 |
| KR | 20130103110 A | 3/2012 |
| KR | 10-2017-0120595 A | 10/2017 |
| KR | 10-2068310 B1 | 1/2020 |
| WO | 2012102377 A1 | 8/2012 |
| WO | 2012104642 A1 | 8/2012 |
| WO | 2013033627 A2 | 3/2013 |
| WO | 2014046198 A1 | 3/2014 |
| WO | 2016115530 A1 | 7/2016 |
| WO | 2018161031 A1 | 9/2018 |

OTHER PUBLICATIONS

Shen (Epigenetics 8:1 34-43 Jan. 2013).*
Zeng (Transl Cancer Res 2017 6(5) 981-998).*
International Search Report and Written Opinion, issued by the International Searching Authority (ISA/KR) in PCT Application No. PCT/KR2020/002727 on Jun. 9, 2020. 6 pages.
Fan, Guorun, et al. "DNA methylation biomarkers for hepatocellular carcinoma." Cancer cell international 18.1 (2018): 1-13.
Qiu, Jiliang, et al. "CpG methylation signature predicts recurrence in early-stage hepatocellular carcinoma: results from a multicenter study." Journal of Clinical Oncology 35.7 (Mar. 2017): 734-742.
Cui, Chenghua, et al. "Genome-wide identification of differential methylation between primary and recurrent hepatocellular carcinomas." Molecular carcinogenesis 55.7 (2016): 1163-1174.
Villanueva et al.; "DNA Methylation-Based Prognosis and Epidrivers in Hepatocellular Carcinoma"; Hepatology; dated Jun. 2015; 12 pages.
Notice of Resason for Refusal issued in JP Application No. 2021-550256; dated Aug. 23, 2022; 13 pages.
Anwar et al.; "Loss of DNA methylation at imprinted loci is a frequent event in hepatocellular carcinoma and identifies patients with shortened survival"; Clinical Epigenetics (2015) 7:110; dated Oct. 15, 2015; 10 pages.
Yang et al.; "Genes Associated with Recurrence of Hepatocellular Carcinoma: Integrated Analysis by Gene Expression and Methylation Profiling"; Oncology & Hematology; dated Sep. 6, 2011; 11 pages.
Long et al.; "DNA methylation-driven genes for constructing diagnostic, prognostic, and recurrence models for hepatocellular carcinoma"; Theranostics 2019, vol. 9, Issue 24; dated Sep. 9, 2015.
Lambert et al.; "Aberrant DNA methylation of imprinted loci hepatocellular carcinoma and after in vitro exposure to common risk factors"; Ciinica! Epigenetics (2015) 7:15; dated Feb. 27, 2015; 13 pages.
Search Report issued in EP Application No. 20762970.0; dated Dec. 16, 2022; 11 pages.
Liu et al.; "Non-coding RNA methylation in the carcinogenesis of hepatocellular carcinoma"; J Prac Hepatol, Nov. 2018.vol. 21 No. 6; dated 2018; 4 pages.

* cited by examiner

Primary Examiner — Amanda Haney
(74) Attorney, Agent, or Firm — Meunier Carlin & Curfinan LLC

(57) ABSTRACT

The present invention relates to a DNA methylation marker for predicting the recurrence of liver cancer by using the difference in the DNA methylation levels according to a liver cancer prognosis, and when the marker is used, the recurrence of liver cancer can be easily predicted, and a more personalized treatment for patients at high risk of liver cancer recurrence can be provided and clinical information for avoiding unnecessary over-treatment can be provided.

4 Claims, 6 Drawing Sheets

Specification includes a Sequence Listing.

DNA METHYLATION MARKER FOR PREDICTING RECURRENCE OF LIVER CANCER, AND USE THEREOF

CROSS REFERENCE TO RELATED APPLICATIONS

This application is a national stage application filed under 35 U.S.C. § 371 of PCT/KR2020/002727 filed Feb. 26, 2020, which claims priority to and benefit of Korean application serial number 10-2019-0024379 filed Feb. 28, 2019.

INCORPORATION BY REFERENCE OF SEQUENCE LISTING PROVIDED AS A TEXT FILE

A Sequence Listing is provided herewith as a text file entitled "11548-003US1_Replacement_Sequence_Listing.txt" created on Jun. 21, 2022, and having a size of 1,747 bytes. The contents of the text file are incorporated by reference herein in their entirety.

Technical Field

The present invention relates to a DNA methylation marker for predicting the recurrence of liver cancer by using the difference in methylation levels of genomic DNA according to a liver cancer prognosis, and a use thereof, which relates, specifically, to a DNA methylation marker for predicting the recurrence of liver cancer in normal liver tissues after treatment of a liver cancer patient.

Background Art

Liver cancer can be largely divided into primary liver cancer (hepatocellular carcinoma, hepatoma) generated from hepatocytes themselves and metastatic liver cancer in which cancers of other tissues have metastasized to the liver. About 90% or more of liver cancer is primary liver cancer, and it is often understood that the term liver cancer refers to primary liver cancer. According to the '2017 Causes of Death Statistics' released by Statistics Korea in September 2018, the number of cancer deaths in 2017 was 153.9 based on the population of 100,000, where 1.0 (0.6%) was increased relative to the previous year. The cancer mortality rate was highest in the order of lung cancer (35.1), liver cancer (20.9), colorectal cancer (17.1), stomach cancer (15.7) and pancreatic cancer (11.3).

Like other cancers, the treatment of liver cancer is largely divided into radical treatment and conservative treatment. Here, the radical cure means a treatment that completely eliminates the cancer itself, and includes liver resection surgery, liver transplantation, radiofrequency ablation, and the like. In addition, if these treatments are not possible, carotid chemoembolization, radiation therapy, and anticancer therapy are performed. However, the complete therapy is almost difficult with such treatments, so that the purpose of medical examination is to provide radical treatment through early detection. In the case of liver resection surgery, about 50% of patients experience cancer recurrence, because the resected liver is also exposed to hepatitis, not a normal liver.

The prognosis of liver cancer means that it predicts various conditions of a patient according to liver cancer, such as complete therapy possibility of liver cancer, possibility of recurrence after treatment and survival possibility of the patient after the liver cancer has been diagnosed, which depends on various conditions such as the severity of the disease, the diagnosis time and the course of treatment. Efficient treatment of liver cancer is possible only when various treatment methods are appropriately applied according to the prognosis. For example, for patients who are expected to have a good prognosis, it is necessary to avoid risky treatment methods that can cause serious side effects to patients, such as aggressive chemotherapy or surgery and radiation therapy, and treatment methods to be relatively moderate, conservative and safe should be selected. Conversely, for patients who are predicted to have a poor prognosis, attempts should be made to increase the survival period or probability by actively mobilizing treatment methods such as chemotherapy or surgery and radiation therapy.

However, regards to the prior art, it is very difficult to accurately predict the prognosis of the liver cancer patient. In order to accurately predict the prognosis, there is a need for an analysis method that classifies patients by risk group, but until now, there is a situation that the prognosis is determined only by the clinical pathological stage of liver cancer at the time of diagnosis and primary surgical treatment without a means to accurately predict the prognosis of liver cancer.

As a result of efforts to solve such a problem, the present inventors have prepared a method capable of predicting the prognosis of liver cancer patients based on DNA methylation data of liver cancer tissues.

DISCLOSURE

Technical Problem

It is an object of the present invention to provide a composition for predicting recurrence of liver cancer comprising a DNA methylation marker and a method for predicting the likelihood of recurrence of liver cancer using the same.

Technical Solution

In order to achieve the above object, one aspect of the present invention provides a composition for predicting recurrence of liver cancer comprising one or more DNA methylation markers selected from the group consisting of DNA methylation markers represented by SEQ ID NOS: 1 to 4.

In the present invention, the DNA methylation markers represented by SEQ ID NOS: 1 to 4 above mean cg21325760, cg10544510, cg06702718 and cg15997204, which are DNA methylation markers represented by CG gene locus symbols (Illumina® Infinium HumanMethylation 850K bead array CpG ID), respectively.

As used herein, the term "liver cancer" is a generic term for cancers occurring in liver tissues, which can be divided into primary liver cancer (hepatocellular carcinoma, hepatoma) generated from hepatocytes themselves and metastatic liver cancer in which cancers of other tissues have metastasized to the liver. Various treatment methods such as liver resection, liver transplantation, radiofrequency ablation and carotid chemoembolization are used for the treatment of liver cancer, but the 5-year survival rate is only 33.6% (average from 2011 to 2015; statistics from the Ministry of Health and Welfare), and the recurrence rate also reaches 70%. Compared to other carcinomas, liver cancer has a low 5-year survival rate and a fairly high recurrence rate, so that there is a need for a method capable of predicting recurrence.

As used herein, the term "DNA methylation" means that a methyl group becomes covalently bonded to the C5-position of a cytosine base in genomic DNA. The methylation level means, for example, the amount of methylation present in the DNA base sequence in all genomic regions and some non-genomic regions, and in the present invention, it means the methylation degree of the DNA methylation markers shown in SEQ ID NOS: 1 to 4. In the DNA methylation markers of SEQ ID NOS: 1 to 4, the methylation may occur throughout the entire sequence.

In the present invention, the composition for predicting recurrence of liver cancer may be a composition comprising one or more, two or more, three or more, or four of the DNA methylation markers. Specifically, the composition for predicting recurrence of liver cancer may comprise one of the DNA methylation markers cg21325760, cg10544510, cg06702718 and cg15997204, respectively, and may comprise a combination of cg21325760 and cg10544510; cg21325760 and cg06702718; cg21325760 and cg15997204; cg10544510 and cg06702718; cg10544510 and cg15997204; or cg06702718 and cg15997204 which is a combination of two. In addition, the composition for predicting recurrence of liver cancer may comprise three of the DNA methylation markers, for example, a combination of cg21325760, cg10544510 and cg06702718; cg21325760, cg10544510 and cg15997204; cg21325760 cg06702718 and cg15997204; or cg10544510, cg06702718 and cg15997204. Furthermore, the composition for predicting recurrence of liver cancer may comprise all of the DNA methylation markers cg21325760, cg10544510, cg06702718 and cg15997204.

In the present invention, the DNA methylation marker cg15997204 is a marker present in the MYT1L gene, and the MYT1L (Myelin Transcription Factor 1 Like) gene encodes a transcription factor belonging to the C-C-H-C zinc finger protein. According to data published in TCGA (The Cancer Genome Atlas), MYT1L is expressed in various cancers, but the correlation between the methylation level of this gene and the recurrence of liver cancer has not yet been known clearly.

In the present invention, the DNA methylation marker cg21325760 is present in the MAGEL2 (MAGE (melanoma-associated antigen) family member L2) gene, and is highly expressed in testicular cancer according to TCGA data, but the correlation between the methylation level of this gene and the recurrence of liver cancer has not yet been known clearly.

Figure 5:
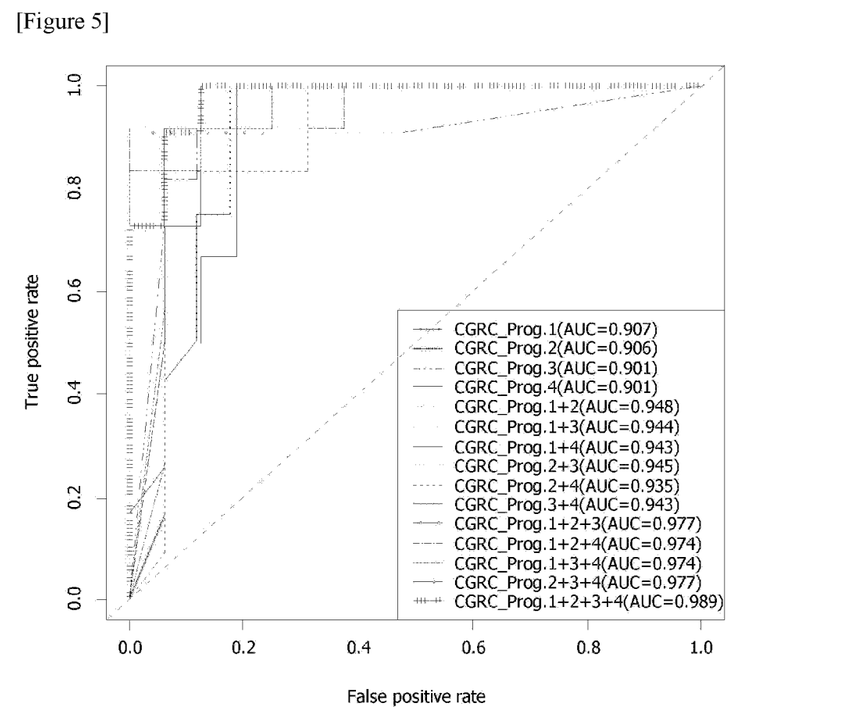
FIG. 5 shows the results of confirming the liver cancer prognosis prediction efficiency according to the number of probes involved in methylation group classification as an area under the curve (AUC) value.

In one embodiment of the present invention, the present inventors confirmed the methylation level with Illumina® Infinium HumanMethylation 850K bead array after isolating genomic DNA from liver cancer tissues. As a result, it was confirmed that the liver cancer tissues were classified into two groups according to the methylation level, and it could be known that the two groups had a significant difference in the recurrence rate of liver cancer. Thereafter, DNA methylation markers with significantly different methylation levels in two groups were identified by machine learning techniques such as random forest, and the DNA methylation markers were discovered (see Table 3). In addition, the present invention has been completed by confirming that when four DNA methylation markers are used together rather than one DNA methylation marker, the accuracy of predicting recurrence of liver cancer converges to 1 (FIG. 5 and Table 2).

In the present invention, the liver cancer may be hepatocellular carcinoma generated from hepatocytes themselves or metastatic liver cancer in which cancers of other tissues have metastasized to the liver, but it may be, preferably, hepatocellular carcinoma. The hepatocellular carcinoma accounts for about 90% of malignant tumors occurring in the liver, and it occurs frequently in Korea, Japan, Southeast Asia, China, and the like. Most occur in a state with cirrhosis, but some are also caused by chronic hepatitis B or C.

As used herein, the term "relapse" means that after treatment for liver cancer in a liver cancer patient, abnormal cell proliferation, that is, liver cancer occurs again in the liver. As the treatment method for the liver cancer patient, liver resection, radiofrequency ablation, carotid chemoembolization, percutaneous ethanol injection and the like may be used, without being limited thereto.

In the present invention, the composition for predicting the prognosis of liver cancer may be implemented in the form of a kit for predicting recurrence of liver cancer, which further comprises a reagent necessary for identifying the methylation level of a DNA methylation marker.

One aspect of the present invention provides a method for predicting recurrence of liver cancer, comprising the following steps:
  (a) a step of isolating genomic DNA from liver tissues to be analyzed;
  (b) a step of detecting the methylation level of one or more DNA methylation markers selected from the group consisting of DNA methylation markers represented by SEQ ID NOS: 1 to 4; and
  (c) a step of comparing the methylation level of the detected DNA methylation marker with the methylation level of the DNA methylation marker detected in normal liver tissues.

In the present invention, the DNA methylation markers represented by SEQ ID NOS: 1 to 4 mean cg21325760, cg10544510, cg06702718 and cg15997204, which are DNA methylation markers represented by CG gene locus symbols (Illumina® Infinium HumanMethylation 850K bead array CpG ID), respectively.

In one embodiment of the present invention, the liver tissue to be analyzed may be a liver cancer tissue, a hepatocellular carcinoma tissue or a metastatic cancer tissue of a site where metastatic liver cancer or liver cancer has metastasized, and preferably, may be a hepatocellular carcinoma tissue. As a method of separating the liver tissue to be analyzed from the subject to be analyzed, a method of percutaneous biopsy, jugular vein biopsy, and the like, known in the technical field to which the present invention belongs may be used.

In one embodiment of the present invention, the method for predicting the prognosis of liver cancer may be a method of identifying the methylation of at least two DNA methylation markers in step (b). The present inventors discovered four DNA methylation markers (probes) capable of predicting the recurrence of liver cancer (see Table 2), and evaluated the performance of predicting liver cancer recurrence according to the number of markers. As a result of the evaluation, it has been confirmed that when there are two or more markers, the performance, such as accuracy and sensitivity, converges to 0.9 and when the number of markers is tree or more, the liver cancer recurrence prediction performance converges to 1 (FIG. 5).

From this result, it can be seen that the DNA methylation marker of the present invention has excellent prognosis prediction performance for liver cancer even when used singly, but its performance is remarkably excellent when used in plurality. Therefore, the DNA methylation markers of the present invention can be used alone or in a combination of two or more as a use for prediction of liver cancer recurrence.

Specifically, as for the DNA methylation markers of the present invention, cg21325760, cg10544510, cg06702718 and cg15997204, respectively, may be used in a single marker, and may be used in a combination of two markers (cg21325760 and cg10544510; cg21325760 and cg06702718; cg21325760 and cg15997204; cg067027510; cg067027510; and cg15997204; or cg06702718 and cg15997204) or a combination of three markers (cg21325760, cg10544510 and cg06702718; cg21325760, cg10544510 and cg15997204; cg21325760 cg06702718 and cg15997204; or cg10544510, cg06702718 and cg15997204). In addition, all four markers may be combined and used.

In one embodiment of the present invention, the method for predicting the prognosis of liver cancer may further comprise, after step (c), a step of determining that when the methylation level of the DNA methylation marker identified in a sample to be analyzed is lower than the methylation level of the normal liver tissue, the likelihood of recurrence of liver cancer is high.

In the present invention, a method for identifying the methylation level of a DNA methylation marker may be performed by PCR, methylation specific PCR, real time methylation specific PCR, and PCR using a methylated DNA specific binding protein, quantitative PCR, DNA chip, pyrosequencing, commercially sold chips, or the like, which is known in the art, but is not limited thereto.

Figure 7:
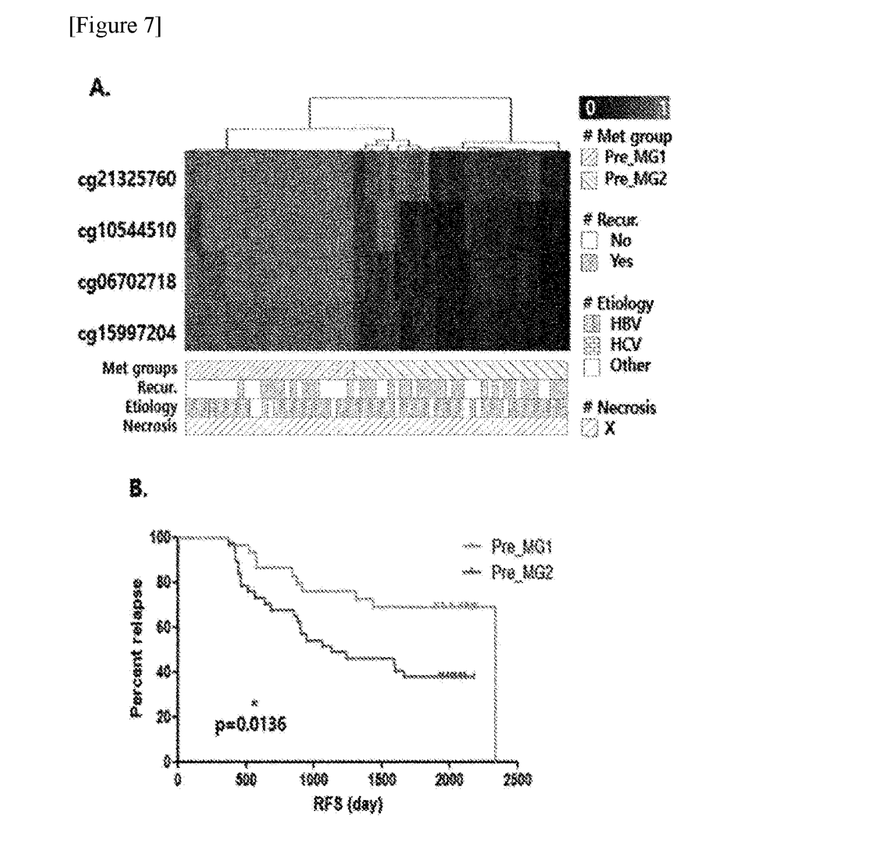
FIG. 7 shows the results of classifying the autonomously produced liver cancer validation cohort data with probes involved in methylation group classification.

The present inventors have confirmed that in a patient with recurrent liver cancer (MG2), the methylation level of the DNA methylation marker is significantly lower than that of the normal liver tissue (N) (FIGS. 3, 7 and 8), and thus the DNA methylation marker can be usefully used as a use for predicting recurrence of liver cancer.

Advantageous Effects

When the DNA methylation marker for liver cancer recurrence prediction of the present invention is used, the recurrence of liver cancer can be easily predicted, and a more personalized treatment for patients at high risk of liver cancer recurrence can be provided and clinical information for avoiding unnecessary over-treatment can be provided.

MODE OF INVENTION

Hereinafter, one or more embodiments will be described in more detail through examples. However, these examples are for illustratively explaining one or more embodiments, and the scope of the present invention is not limited to these examples.

Experimental Method

1. Recruitment of Patients with Hepatocellular Carcinoma

The research conducted in relation to the present invention was approved by Review Committed in Seoul National University Hospital, and proceeded with written consent from all patients. 184 patients who underwent hepatocellular carcinoma (hereafter, referred to as HCC) resection at Seoul National University Hospital Surgery from 2011 to 2016 were recruited, and clear microscopic margins and complete excision of tumors were confirmed through postoperative CT scans. The patients visited the hospital regularly and were monitored for recurrence every 3 months based on standard protocols including serum tumor markers, α-fetoprotein (AFP) levels, contrast CT scans or magnetic resonance imaging (MRI). The recurrence was classified into early (≤1 year) and late (>1 year) recurrence, and patients with recurrence within 1 year after HCC resection were excluded. Demographic data and clinicopathological characteristics were identified on hospital charts, and the patients were followed up after resection until death. The reason for excluding patients with recurrence within 1 year is because, in the case of early recurrence, HCC resection has been incorrect or recurrence is common for reasons other than liver cancer, and thus it does not meet the purpose of the present invention for discovering a marker involved in the recurrence of new cancer in a purely normal liver after cancer treatment.

2. Generation of Methylation Data

Among the 182 HCC patients, 42 patients with HCC recurrence within 1 year after surgery were excluded from the analysis. DNA was extracted from frozen HCC samples obtained from the remaining 140 patients using the MagListo™ 5M Genomic DNA Extraction Kit (Bioneer) according to the manufacturer's instructions. An Illumina Infinium HumanMethylation EPIC 850K BeadChip (Illumina) analysis was performed together with an Illumina iScan System (Illumina, CA, USA) according to the manufacturer's standard protocol using 500 ng of DNA for each sample. The Illumina Infinium HumanMethylation EPIC BeadChips comprise DNA methylation values for 850,000 or more CpG sites for the resolution of every single nucleotide.

3. DNA Methylation Data Processing

For the data obtained with Illumina Infinium HumanMethylation EPIC BeadChips in 2 above, pre-processing on the methylation data was performed using the minfi R package in the R platform (https://cran.r-project.org/bin/windows/base/; version 3.3.2), which was an open software. Specifically, raw IDAT files of HCC samples were processed, and background correction and dye deviation were corrected. Thereafter, the signal intensity of the methylated and unmethylated probes was measured, and thus the DNA methylation value of each probe was quantified as a b-value in the range of 0 (unmethylated) to 1 (completely methylated). Next, data quality control was performed on all samples, and all 140 samples passed the quality control criteria. Finally, in order to reduce the batch effect problem, the methylation data were normalized using a functional normalization method.

4. DNA Methylation Values

Methylation b-values were converted to M-values according to Equation 1 below for statistical analysis.

$$M\text{-value}=\log((b\text{-value})/(1-(b\text{-value})))$$ [Equation 1]

The M-value was used for consensus clustering, and the b-value was used for heat map visualization and box plot generation.

5. Consensus Clustering

The consensus clustering was performed to identify HCC subgroups using ConsensusClusterPlus (https://bioconductor.org/packages/release/bioc/vignettes/Consensus Cluster Plus/inst/doc/ConsensusClusterPlus.pdf). The top 3,000 most variable probes (median absolute deviation (MAD)) (MAD 3K) were used as inputs.

6. Selection of Prognostic Markers

The random forest method is based on a machine learning algorithm developed to model nonlinear effects. The present inventors discovered probes capable of discriminating HCC groups with good or bad prognoses using the Random Forest R package of the R platform, and randomly divided HCC tumor samples into 4 training cohorts and 1 test cohort to perform five-fold cross validation. As a result of performing, the present inventors built a random forest model, where the expected ratio of each group was predicted by a confusion matrix (predicted samples vs observed samples), and the performance of each model was determined based on the area under the curve (AUC), sensitivity and specificity values.

Figure 4:
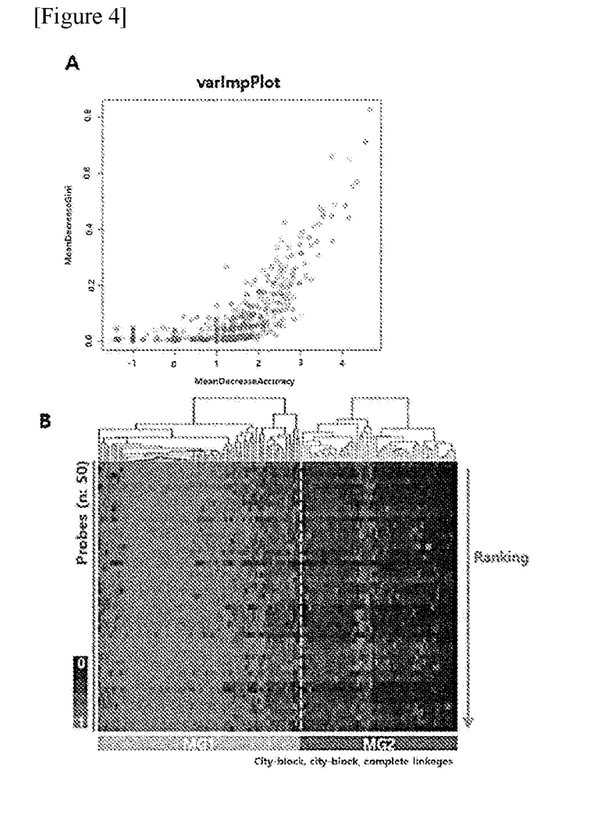
FIG. 4 shows the process of confirming the variable importance plot (varImpPlot) in methylation group 1 (MG1) and methylation group 2 (MG2) (A), and then selecting the top 50 probes involved in methylation group classification (B).

The present inventors measured the importance value of each probe in consideration of the Gini index, overall reduction of probe impurity, and a dot chart of variable importance measured by random forest. As a result, the present inventors discovered the top 50 probes capable of classifying HCC samples into methylation groups 1 and 2 (hereinafter, described to as MG1 and MG2, respectively) (FIG. 4). Thereafter, while comparing the performance efficiencies of one probe and the top 50 probes, the minimum number of probes with the maximum efficiency was confirmed by considering the AUC value.

7. Gene Ontology and Pathway Analysis

The present inventors performed various path searches and gene ontology analyses using innateDB (http://www.innatedb.com/). In the innateDB, Gene Ontology biological processes, KEGG (Kyoto Encyclopedia of Genes and Genomes) and Reactome resources were used. The significant cutoff criterion was p-value<0.05.

9. Statistical Analysis

Statistical analyses of categorical variables were performed using Pearson's chi ($\chi^2$) test or Fisher's exact test. The median period of relapse-free survival (RFS) was calculated by the Kaplan-Meyer method, and the comparison between different groups was performed by log-rank tests.

Experiment Result

1. Patient Selection and Basic Characteristics

Figure 1:
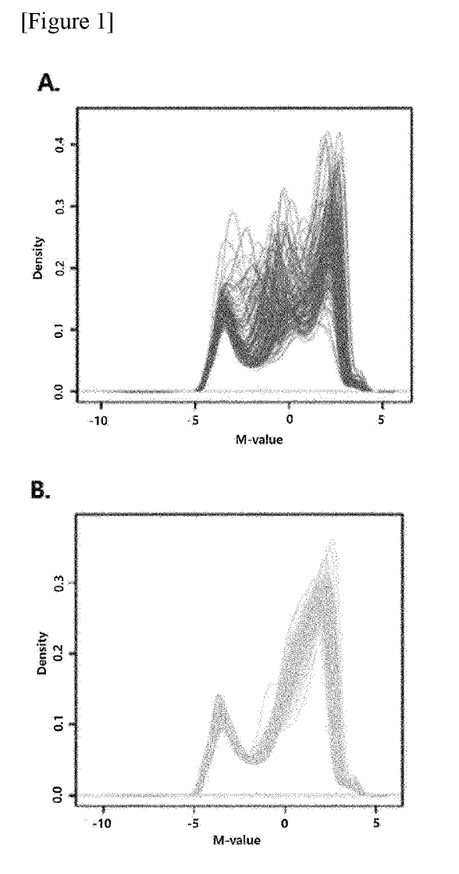
FIG. 1 shows the results of identifying the methylation level of DNA isolated from a hepatocellular carcinoma sample (A; n=140)) and a normal liver sample (B; n=96).

Among 182 HCC patients, 42 patients with HCC recurrence within 1 year after surgery were excluded from the analysis. As a result of identifying the methylation of 140 HCC samples, it could be seen that the HCC samples showed a large variation in methylation between samples, whereas the normal tissues showed almost constant methylation (FIG. 1).

2. Comparison of Methylation Profiles of MG1 and MG2

Figure 2:
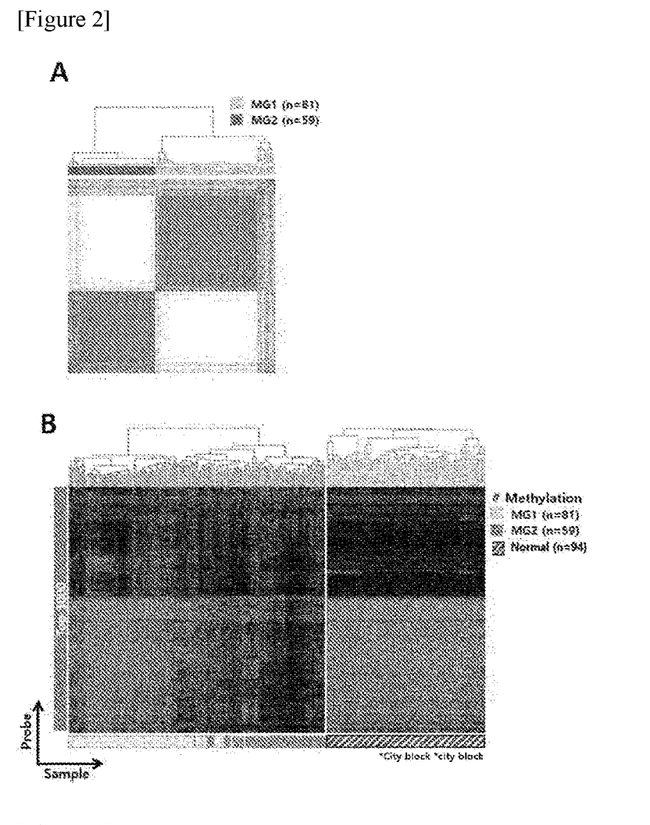
FIG. 2 shows the results of classifying hepatocellular carcinoma samples (n=140) methylation group 1 (MG1; n=81) and methylation group 2 (MG2; n=59) according to the prognosis, and then classifying each sample by the consensus clustering method according to the DNA methylation pattern.
Figure 3:
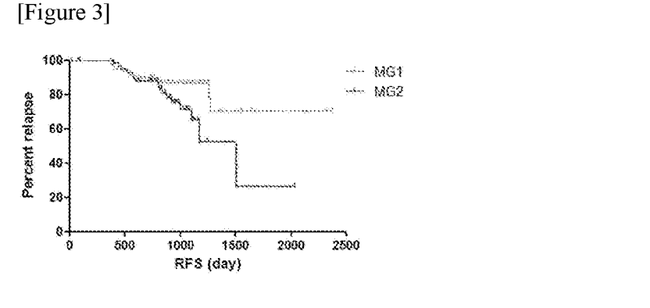
FIG. 3 shows the results of identifying the recurrence free survival (RFS) of methylation group 1 (MG1) and methylation group 2 (MG2).

As a result of classifying 140 HCC samples according to DNA methylation patterns, it was confirmed that they were divided into methylation group 1 (n=81) and group 2 (n=59) (hereinafter, described as MG1 and MG2, respectively) (A in FIG. 2). In addition, the methylation profile of MG2 was most different from that of non-neoplastic liver tissues, and the methylation profile of MG1 was similar to that of non-neoplastic liver tissues (B in FIG. 2). It could be seen that MG1 had a long recurrence-free survival (RFS) period, whereas MG2 had a short recurrence-free survival period, thereby resulting in a poor prognosis (FIG. 3).

Such epigenetic changes were associated with signal transduction, MAPK (mitogen-activated protein kinase) and G protein-coupled receptor (GPCR) signaling pathways (Table 1). When the present inventors interpreted a series of genes based on the GO (gene ontology) system of the group, the top 50 probes were associated with catabolism, neurotransmitter secretion, regulation of molecular function, Wnt signaling pathway, cell migration regulation, mRNA metabolism, small GTPase-mediated signal transduction, gene expression regulation, and regulation of apoptosis processes.

TABLE 1

| Pathway analysis (n: 3226 reference sequence gene) | Source | Number of genes | P-value |
|---|---|---|---|
| Neuronal system | REACTOME | 54 | 2.92E−13 |
| Transmission across chemical synapses | REACTOME | 36 | 1.61E−08 |
| NRAGE signals death through JNK | REACTOME | 13 | 3.56E−06 |
| Signaling by Rho GTPases | REACTOME | 22 | 1.25E−05 |
| Extracellular matrix organization | REACTOME | 36 | 3.71E−05 |
| Axon guidance | REACTOME | 42 | 5.75E−05 |
| Pathways in cancer | KEGG | 35 | 0.004137 |
| Calcium signaling pathway | KEGG | 22 | 0.005238 |
| Signal transduction | REACTOME | 157 | 0.006263 |
| Cell adhesion molecules (CAMs) | KEGG | 16 | 0.030841 |
| MAPK signaling pathway | KEGG | 25 | 0.03735 |
| GPCR downstream signaling | REACTOME | 75 | 0.040999 |
| Hemostasis | REACTOME | 44 | 0.044817 |

3. Selection of Markers for Predicting HCC Recurrence

The top 50 probes capable of classifying HCC samples into MG1 and MG2 were discovered using a variable importance plot (varImpPlot) (FIG. 4). Thereafter, while comparing the performance efficiency according to the number of probes, the minimum number of probes having the maximum efficiency was selected in consideration of AUC (area under the curve) values. As a result, it could be seen that when the number of probes was three or more, the accuracy of liver cancer recurrence prediction converged to 1 (FIG. 5 and Table 2). The letters described in Table 2 below mean accuracy (Accu.), sensitivity (Sen.) and specificity (Spec.), respectively.

TABLE 2

| CGRC_ID | Accu. | Sen. | Spec. | AUC |
|---|---|---|---|---|
| CGRC_Prog. 1 | 0.8621 | 0.9167 | 0.8235 | 0.9069 |
| CGRC_Prog. 2 | 0.8214 | 0.8333 | 0.8125 | 0.9063 |
| CGRC_Prog. 3 | 0.7857 | 0.8333 | 0.7555 | 0.9010 |
| CGRC_Prog. 4 | 0.7857 | 0.7500 | 0.8125 | 0.9010 |
| CGRC_Prog. 1 + 2 | 0.8929 | 0.8333 | 0.9375. | 0.9479 |
| CGRC_Prog. 1 + 3 | 0.8966 | 0.9167 | 0.8824 | 0.9436 |
| CGRC_Prog. 1 + 4 | 0.8519 | 0.8182 | 0.8750 | 0.9432 |
| CGRC_Prog. 2 + 3 | 0.9286 | 1.0000 | 0.8750 | 0.9453 |
| CGRC_Prog. 2 + 4 | 0.8889 | 0.8182 | 0.9375 | 0.9347 |
| CGRC_Prog. 3 + 4 | 0.8929 | 1.0000 | 0.8125 | 0.9427 |
| CGRC_Prog. 1 + 2 + 3 | 0.9630 | 0.9091 | 1.0000 | 0.9773 |
| CGRC_Prog. 1 + 2 + 4 | 0.9286 | 0.9167 | 0.9375 | 0.9740 |
| CGRC_Prog. 1 + 3 + 4 | 0.9286 | 0.9167 | 0.9375 | 0.9740 |
| CGRC_Prog. 2 + 3 + 4 | 0.8889 | 0.9091 | 0.8750 | 0.9773 |
| CGRC_Prog. 1 + 2 + 3 + 4 | 0.963 | 0.9091 | 1.0000 | 0.9886 |

Based on the results of Table 2 above, the probes described in Table 3 below were finally selected, where the probes were described in order of high importance values.

TABLE 3

| Probe_ID | CGRC_ID | Gene_ID | chr | start | end |
|---|---|---|---|---|---|
| cg21325760 | CGRC_Prog. 1 | MAGEL2 | chr15 | 23891342 | 23891463 |
| cg10544510 | CGRC_Prog. 2 |  | chr5 | 3761166 | 3761287 |
| cg06702718 | CGRC_Prog. 3 |  | chr12 | 132921267 | 132921388 |
| cg15997204 | CGRC_Prog. 4 | MYT1L | chr2 | 2189602 | 2189723 |

The sequences of the probes described in Table 3 were described in Table 4 below.

TABLE 4

| SEQ ID NO | Probe_ID | Genomic sequence* |
|---|---|---|
| 1 | cg21325760 | GGCCTGCCAGAGCGGTGGCTGGGTGGCCAGGACC TGTGGGGCAGGTCGGATGGGCGGCGG[CG]CCTG GCGGATCAGCGGCGGGGCCTGGCGGATCACAGGT GGAGCCTGGCGGATCACAGGTG |
| 2 | cg10544510 | CCTTCAGAGAGGAAGAATCTTAAGGCGCGTCCAA GACAAGCGGAGTCGAGGACTCCGTTT[CG]GGGA GGTTTACCTGAAAAGCTGTGTGGAAAAACCCGAC TGCGACTTTCAAGCTTGTGCTT |
| 3 | cg06702718 | CTGCAACATCACCGACAAAGAGCATGAAAATGTG AATGACAGGACTCTAAAAAGAACGCA[CG]TTTA CTCCGAGAGCGGAAACAAGAAGGCGGGTGCGGCC TCACTCCTTCCCGGCCAGGCAC |
| 4 | cg15997204 | CTTCTGTGAGGGGGACGCAGCCGGGCCTCCCAGA CGCCCGCGTTCCTTACGTGAGGGGGA[CG]CAGC CGGGCCTTCCGGGCCTTCCCAAGTCCCGCGTTCC TTCTGTGAGGCGGACGCAGCCG |

Figure 6:
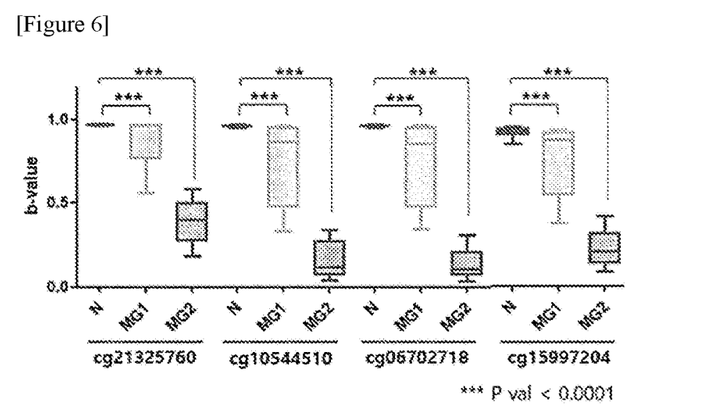
FIG. 6 shows the results of identifying the methylation level of probes involved in methylation group classification in a normal liver sample (N), methylation group 1 (MG1) and methylation group 2 (MG2).

*In the genomic sequence, [CG] means the methylation site targeted by the relevant CG marker 3. HCC Recurrence Predictive Marker Validation As a result of identifying the methylation level for the probes described in Table 3 using the random forest method, it could be confirmed that the methylation level in normal liver tissues (green) was close to 100% and at a constant level, and MG1 (red) showed the methylation level similar to that of the normal liver tissues, whereas the methylation level of MG2 (gray) was about 50% or less compared to that of the normal liver tissue (FIG. 6; the X-axis is the selected markers, and the Y-axis is the b-values indicating the methylation level).

In addition, 140 HCC samples were randomly divided into training data and validation data, and as a result of testing them again with the probes in Table 3, it could be confirmed that the existing MG1 was again classified as MG1, and the existing MG2 was also again classified as MG2 (Table 5).

TABLE 5

| Type | | MG1 | MG2 |
|---|---|---|---|
| Training data | MG1 | 59 | 6 |
|  | MG2 | 4 | 44 |
| Validation data | MG1 | 16 | 1 |
|  | MG2 | 0 | 10 |

The liver cancer cohort data autonomously produced by the present inventors were verified with the probes in Table 3. As a result, it could be confirmed that the liver cancer cohort data were classified into two groups (Pre_MG1 and Pre_MG2) according to the methylation level, and the recurrence rate was high in Pre_MG2 (A in FIG. 7). In addition, as a result of confirming the RFS, it could be confirmed that the RFS of Pre_MG1 was significantly longer than that of Pre_MG2 (p=0.0136; B in FIG. 7). This result means that it is possible to successfully predict the recurrence of liver cancer with the probes of the present invention.

Figure 8:
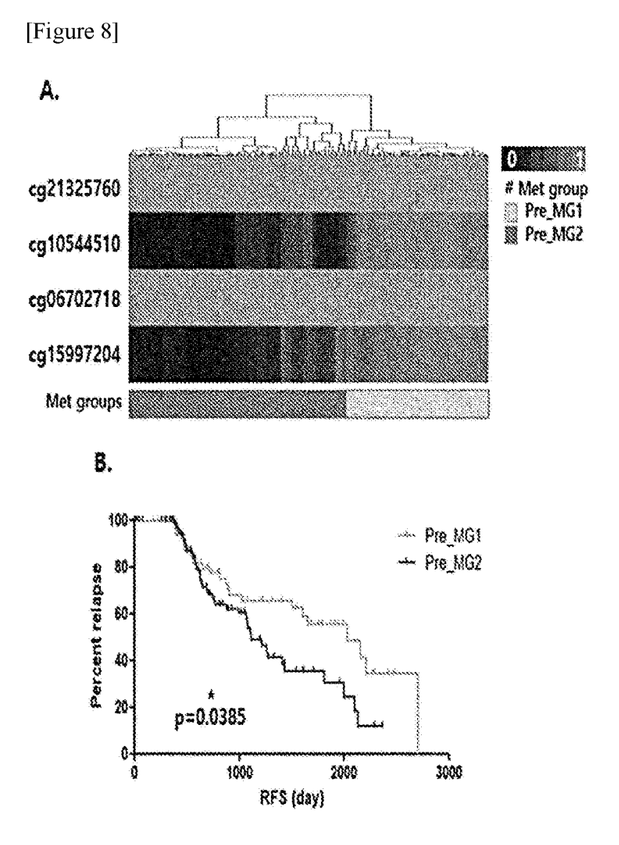
FIG. 8 shows the results of classifying liver cancer data published in TCGA (the cancer genome atlas) with probes involved in methylation group classification.

In addition, as a result of validation for the TCGA (the cancer genome atlas) liver cancer data, an open database, with the probe in Table 3 in the same manner, it could be confirmed that the liver cancer patients were classified into groups (Pre_MG1 and Pre_MG2) (A in FIG. 8), and these groups had different prognoses (B in FIG. 8).

The invention claimed is:

1. A method for predicting high risk of recurrence of liver cancer comprising:
   (a) providing a kit comprising reagents capable of detecting methylation levels of at least two DNA methylation markers, wherein the DNA methylation markers are selected from SEQ ID Nos: 1, 2, 3, and 4
   (b) isolating genomic DNA from a liver tissue sample derived from a subject;
   (c) detecting, in the isolated genomic DNA, methylation levels of at least two DNA methylation markers by using the kit;
   (d) determining that the methylation levels of the DNA methylation markers in the liver tissue sample are 50% or less compared to that of the methylation levels of the DNA methylation markers in normal liver tissues,
   (e) predicting that the subject has a high risk of liver cancer recurrence; and (f) treating the subject predicated to have a high risk of liver recurrence with chemotherapy, surgery, or radiation therapy.

2. The method for predicting high risk of recurrence of liver cancer according to claim 1, wherein the liver cancer is hepatocellular carcinoma.

3. The method for predicting high risk of recurrence of liver cancer according to claim 1, wherein the method predicts a recurrence prognosis of liver cancer in a normal liver after treatment of a patient with liver cancer.

4. The method for predicting high risk of recurrence of liver cancer according to claim 1, wherein the method detects methylation levels of at least three DNA methylation markers.

* * * * *

SEQUENCE LISTING

```
<160> NUMBER OF SEQ ID NOS: 4

<210> SEQ ID NO 1
<211> LENGTH: 122
<212> TYPE: DNA
<213> ORGANISM: Artificial Sequence
<220> FEATURE:
<223> OTHER INFORMATION: synthetic polynucleotides

<400> SEQUENCE: 1
ggcctgccag agcggtggct gggtggccag gacctgtggg gcaggtcgga tgggcggcgg      60 cgcctggcg atcagcggcg gggcctggcg gatcacaggt ggagcctggc ggatcacagg     120
tg                                                                  122

<210> SEQ ID NO 2
<211> LENGTH: 122
<212> TYPE: DNA
<213> ORGANISM: Artificial Sequence
<220> FEATURE:
<223> OTHER INFORMATION: synthetic polynucleotides

<400> SEQUENCE: 2
ccttcagaga ggaagaatct taaggcgcgt ccaagacaag cggagtcgag gactccgttt      60
cggggaggtt tacctgaaaa gctgtgtgga aaacccgac tgcgactttc aagcttgtgc     120
tt                                                                  122

<210> SEQ ID NO 3
<211> LENGTH: 122
<212> TYPE: DNA
<213> ORGANISM: Artificial Sequence
<220> FEATURE:
<223> OTHER INFORMATION: synthetic polynucleotides

<400> SEQUENCE: 3
ctgcaacatc accgacaaag agcatgaaaa tgtgaatgac aggactctaa aaagaacgca      60
cgtttactcc gagagcggaa acaagaaggc gggtgcggcc tcactccttc ccggccaggc     120
ac                                                                  122

<210> SEQ ID NO 4
<211> LENGTH: 122
<212> TYPE: DNA
<213> ORGANISM: Artificial Sequence
<220> FEATURE:
<223> OTHER INFORMATION: synthetic polynucleotides

<400> SEQUENCE: 4
cttctgtgag ggggacgcag ccgggcctcc cagacgcccg cgttccttac gtgaggggga      60
cgcagccggg ccttccgggc cttcccaagt cccgcgttcc ttctgtgagg cggacgcagc     120
cg                                                                  122
```